United States Patent [19]

Halim et al.

[11] Patent Number: 5,191,651
[45] Date of Patent: Mar. 2, 1993

[54] APPARATUS AND METHOD FOR MAKING OF INTERCONNECTED PROCESSORS ACT LIKE A SINGLE NODE IN A MULTINODE COMMUNICATION SYSTEM

[75] Inventors: Nagui Halim, Yorktown Heights; Christos N. Nikolaou, New York; John A. Pershing, Jr., Croton-on-Hudson, all of N.Y.

[73] Assignee: International Business Machines Corporation, Armonk, N.Y.

[21] Appl. No.: 682,889

[22] Filed: Apr. 8, 1991

Related U.S. Application Data

[63] Continuation of Ser. No. 116,424, Nov. 3, 1987, abandoned.

[51] Int. Cl.⁵ .................. G06F 13/00; G06F 15/16
[52] U.S. Cl. .................. 395/200; 364/DIG. 1; 364/927.92; 364/931.4; 364/931; 364/229; 364/229.4; 364/276.5; 364/276.8; 364/284; 364/284.3; 364/284.4

[58] Field of Search ... 364/200 MS File, 900 MS File, 364/DIG. 1 MS File, DIG. 2 MS File; 395/200, 250, 275, 325, 600, 800

[56] References Cited

U.S. PATENT DOCUMENTS

| | | | |
|---|---|---|---|
| 4,428,043 | 1/1984 | Catiller et al. | 364/200 |
| 4,466,060 | 8/1984 | Riddle | 364/200 |
| 4,500,960 | 2/1985 | Babecki | 364/200 |
| 4,545,011 | 10/1985 | Lyon et al. | 364/200 |
| 4,667,287 | 5/1987 | Allen et al. | 364/200 |
| 4,677,588 | 6/1987 | Benjamin et al. | 364/900 |

Primary Examiner—Robert B. Harrell
Attorney, Agent, or Firm—Ronald L. Drumheller

[57] ABSTRACT

A method and apparatus for coupled computer systems provides a single network node image when connected to a computer network, so that the network is unaware of the "fine" structure of the computer systems in the machine room. The coupled complex is made available to the network.

9 Claims, 8 Drawing Sheets

APPARATUS AND METHOD FOR MAKING OF INTERCONNECTED PROCESSORS ACT LIKE A SINGLE NODE IN A MULTINODE COMMUNICATION SYSTEM

This is a continuation of application Ser. No. 07/116,424, filed Nov. 3, 1987, now abandoned.

BACKGROUND OF THE INVENTION

1. Field of the Invention

The invention relates generally to computer networks, and more specifically to a method and apparatus for presenting the image of a single node to a computer network for a computer center having a plurality of computers.

2. Description of the Prior Art

Terminals and intelligent workstations are generally linked to data centers, which may in turn be linked to other data centers. Thus, an end user may have access, not just to a local high performance computer system, but to high performance computer systems in data centers located throughout the world to provide access by geographically remote users to applications and data, as well as to permit workstation to workstation communication. Examples are found in banking, point of sale networks and the airline industry.

Such data centers (or computer centers) have fast growing computing and storage requirements. In some systems tens of thousands of users interact with the computer center and require thousands of transactions per second, while needing a response time of one or two seconds.

In order to provide maximum capacity and availability, a plurality of computer systems are often coupled together within a single data center. By coupling computers together, data processing jobs that require more capacity than that ordinarily available from the single most powerful computer in the data center can still be processed since the processing load can be distributed amongst a number of computers. Furthermore, the availability of multiple computers permits fault tolerance, since another system or computer can take over in the event of failure or other outage.

Existing coupling schemes provide various degrees of capacity and availability advantages over single system designs and, more importantly, provide the image of a single system to the program running in the system. Thus a program usually does not know or care which computer system it is running on.

Even though a complex of coupled computer systems may appear as a single system from the point of view of a program running within the complex, users accessing the complex from their terminals via a computer network still 'see' a multiple system having separate computer systems. A user must 'log' on to an individual one of several computer systems. This is a potential bottleneck to the user if the chosen system is overloaded or if it happens to fail.

Also, the failure to provide a single data center with a single node image to the network increases the complexity of the network. The multiplicity of processors in a data center should be transparent to the network but is not in existing networks.

In known networks, when a new computer is added to a data center, the network must be notified, and new network routes have to be defined using the new computer as a network node, thus generating network control traffic. Balancing the load on any particular processor in the data center must also then, involve the network, since processes controlling virtual circuits (sessions) would have to be relocated from an overloaded processor to an idle processor. If each processor, however, represented a different network node, then relocation of virtual circuits would involve their termination on one node and reactivation on another node (processor). Such relocation involves high network overhead and disruption. Avoidance of such relocation is desirable since it improves network performance.

There are a number of examples of such coupling already in existence including complexes of MVS systems under the control of the IBM Corp. JES2 or JES3 programs, complexes of UNIX systems coupled under the Locus system of UCLA and complexes using the IBM Corporation VM (virtual machine) system. These systems provide various degrees of capacity and availability improvement over that of a single system, and more importantly, in these systems a program usually doesn't "know" or "care" which computer system it is running on. The prior art, however, does not describe a system in which a complex of computers can appear to be a single node to a network connected to the complex.

The invention will now be described in an environment that is substantially based upon the IBM Systems Network Architecture (SNA). The invention, however, is not restricted to any specific type of network. A typical SNA network is described in the IBM manual "SNA Concepts and Products," IBM publication GC30-3072, and the IBM publication SNA Technical Overview, GC30-3073.

It is thus an object of the present invention to provide a system and method for attaching a complex of coupled systems to a network (or to multiple networks) such that these systems provide the image of a single network node to the network and, thereby, to the users accessing the complex via the network.

It is a further object to provide the network connection in such a way that the enhanced capacity and availability of the coupled complex is made available to the network.

These and other objects, advantages and features of the invention will be more apparent upon reference to the attached specification and drawings.

SUMMARY OF THE INVENTION

In a preferred yet nonetheless illustrative embodiment of the present invention an apparatus for coupling a computer complex having a plurality of coupled processors in a node is provided. The computer complex will, as a result of the present invention, appear to the network to be a single node. The node is coupled to a data communication network having a plurality of nodes and a plurality of communication lines linking the nodes, in which the communication lines are grouped into transmission groups. Each of the transmission groups include at least one of the communication lines. One of the processors in the complex is designated a control processor and includes resource managers for controlling functions within one of the nodes. The others of the processors are designated non-control processors. The non-control processors include a network access method (NAM) operational therein and containing resources for directing data transport functions in and out of the node. The data transport functions for a node are contained amongst a plurality of the NAMS. At least one processor in the network includes a system services control point program for managing the network by sending instruction to the control processors.

DESCRIPTION OF THE PREFERRED EMBODIMENTS

Figure 1:
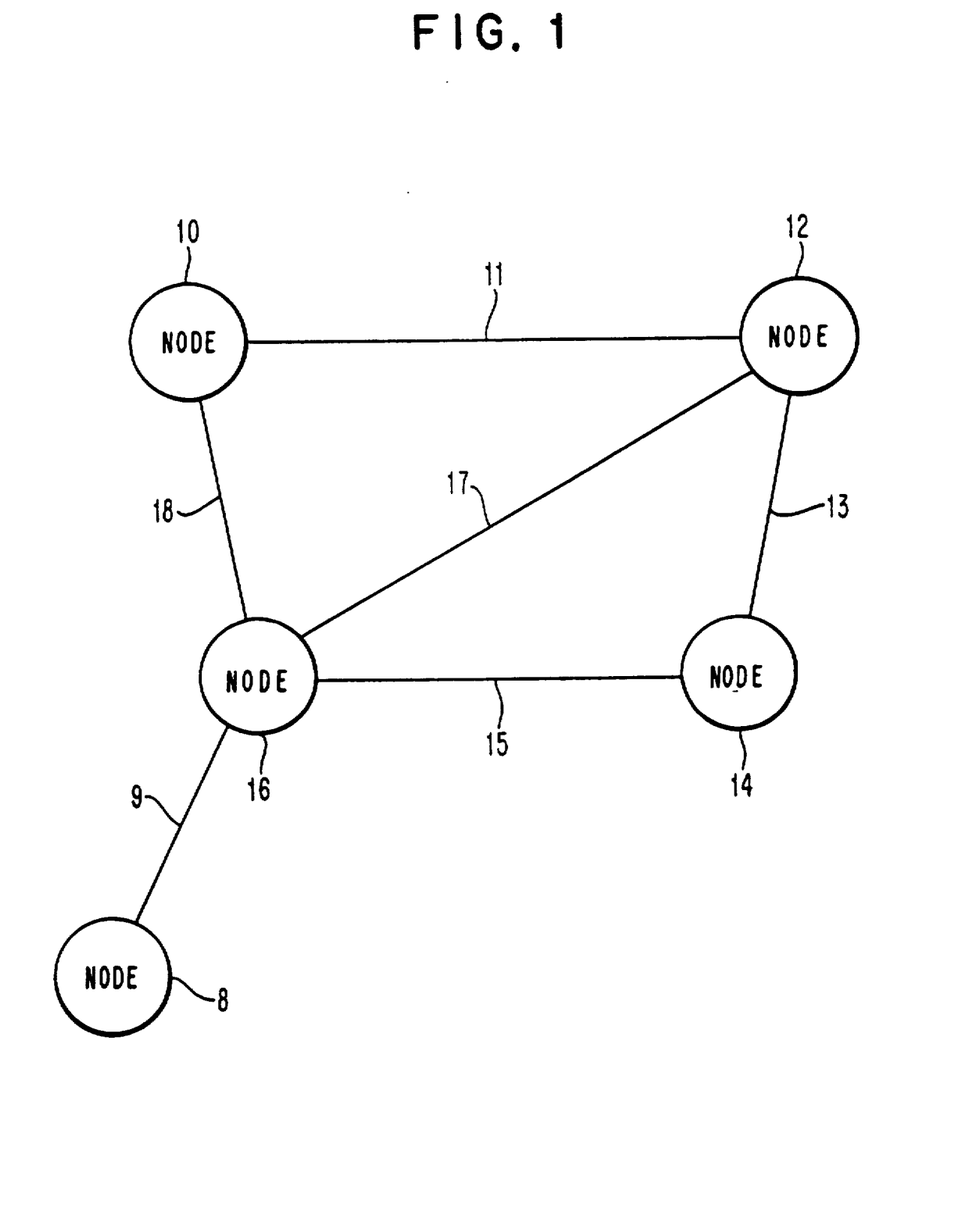
FIG. 1 shows the coupling of nodes in network.

Refer to FIG. 1. in which a simplified network is shown. For purposes of explanation, this network has five nodes 8, 10, 12, 14 and 16 and five links 9, 11, 13, 15, 17, and 18. Links 9, 11, 13, 15, 17, and 18 are logical communication links and may include more than one physical connection.

Communication between any two selected nodes can usually take place over several routes. For example, node 10 can communicate with node 14 via link 11, node 12 and link 13, or link 18, node 16, and link 14, and others. Node 8 can communicate with other nodes in the network only via link 9 and node 16.

Architecturally, a network node is simply a point of termination for one or more telecommunication lines. Usually, a single node is equivalent to a single computer. Using the present invention, however, a complex of multiple, coupled systems can also be considered a single node.

This invention describes a method and apparatus for attaching a complex of coupled systems to virtual circuit oriented networks such as the IBM Corp. Systems Network Architecture (SNA). A virtual circuit (or session) is defined as a logical connection between two network users that can be activated and tailored to provide various protocols, and deactivated as requested. The session activation request and response can determine options relating to such things as the rate and concurrency of data exchange, the control of contention and error recovery and the characteristics of the data stream.

The definition of the functions a computer network and its components must perform is its architecture. The software code or hardware that performs these functions is the implementation. Network architectures are ordinarily described in layered, peer architectures, that generally resemble the architecture shown in FIG. 2. These are not physical layers but are used instead to provide a conceptual framework for understanding the overall operation of the programming and hardware. More importantly, by adopting a structure using a standardized layered architecture having a predefined interface between layers, changes can be made to a single layer without necessitating changes to other layers.

Unlike processor or storage subsystem architecture, network architecture always involves a pairwise interaction of two parties. For example, as will be clearer from the following, a Data Link Control (DLC) element in one node interacts with a DLC in another; similarly, the routing functions in two nodes specifically interact with each other, etc.

The set of agreements for each of the pairwise interactions is called a protocol, and thus network architecture is specified in terms of protocols for communication between pairs of peer level layers. A network protocol consists of three elements, (1) syntax, that is, the structure of commands and responses in either field formatted (header bits) or character string form; (2) semantics, which is the set of requests to be issued, actions to be performed, and responses returned by either party; and (3) timing, which is the specification and ordering of events.

Figure 2:
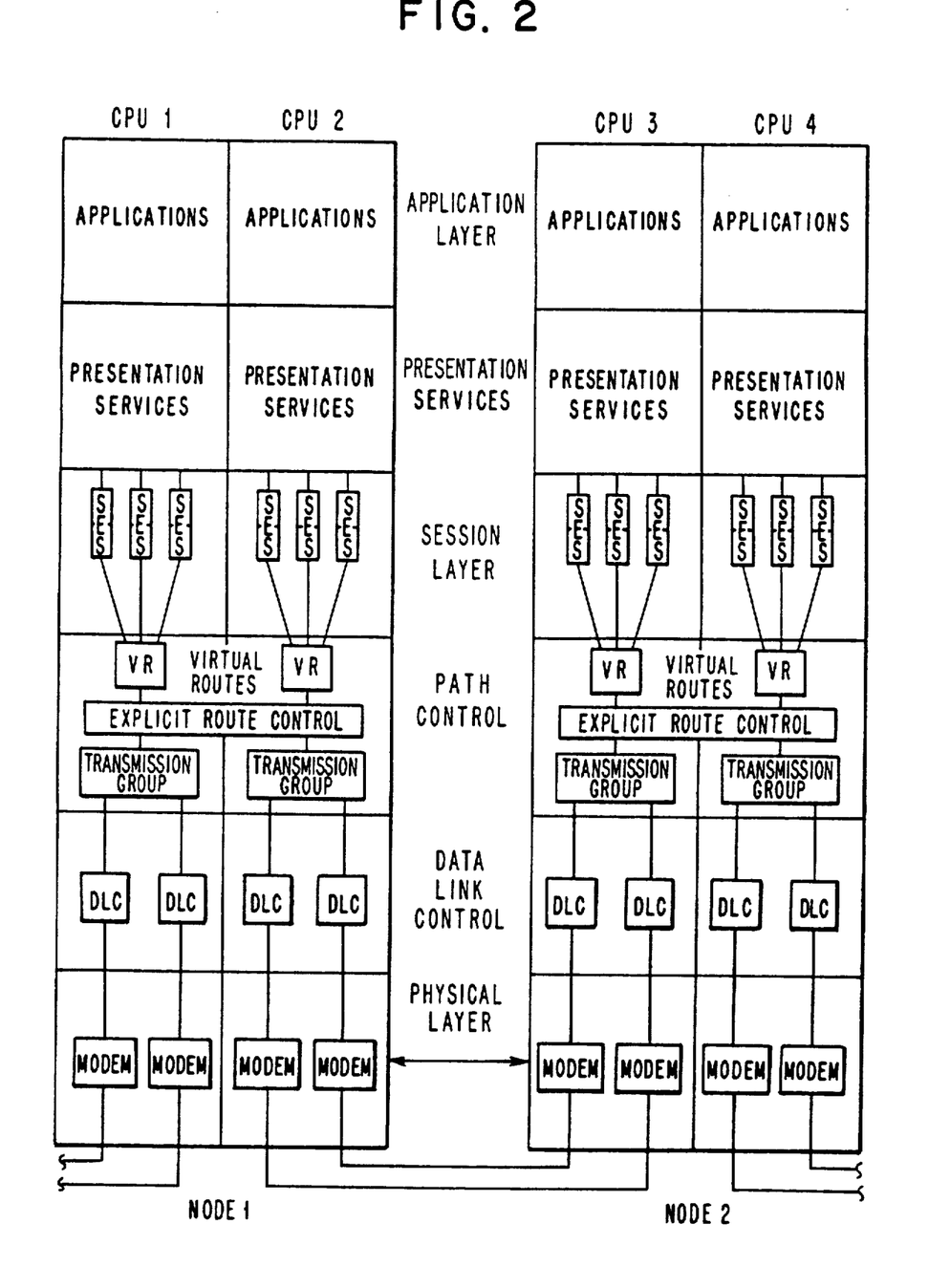
FIG. 2 shows a network architecture incorporating the present invention.

FIG. 2 shows schematically, the layered architecture of SNA. No intermediate nodes are shown, but in practice, one or more such nodes could exist. Furthermore, the layers at one end may be in more than one physical box. For example, at the host end, all functions could be in the host, or alternatively functions corresponding to DLC and Path Control could reside in the software of a separate communication controller and the rest in the host. It is also possible to move all access path functions to a front end communications processor, leaving the host processor free to concentrate on application processing. At the terminal end, all functions shown may be in the same box in an intelligent terminal, and all except the uppermost layer could reside in a cluster controller that supports several dumb terminals.

Physical control layer (layer 1) provides the actual physical link between the ultimate user and ultimate recipient. This layer includes the various hardware components such as modems, telephone lines, etc. This layer defines the electrical characteristics needed to establish, maintain and disconnect, the electrical connection between two DTE (data terminal equipment) or a DTE and a DCE (data circuit terminating equipment).

The Data Link Control (DLC) layer (layer 2) transfers packets of data (usually called frames) intact across often noisy transmission facilities. There is a DLC element (DLCE) for each of lines 20-25 (shown in FIG. 4 and described below) attached. The DLC may include error detection and correction. The DLC functions are performed by line adaptors 30-35 also shown in FIG. 4.

The Path Control (PC) Layer (layer 3) is responsible for routing incoming packets of data to the appropriate outgoing DLCE or to the correct point within the same node. It handles addressing of data packets and identifies the paths a data packet will take to get to a specific address. In some architectures this is known as the network layer. There is generally one Path Control element per node.

The Path Control layer also includes the transport end-to-end layer which provides control from user node to user node across a network. This includes network congestion controls such as addressing, data assurance and flow control.

The Path Control layer, together with the session layer make up the Data Transport Functions. The Path Control Layer includes the Transmission Group (TG), Virtual Route (VR) and Explicit Route (ER), sublayers or functions. The VR sublayer is used to control end-to-end continuity of data packets. It does this based upon the congestion of the system and the priority of the data. The ER sublayer maps out the actual physical route that a data packet will take. For example, referring to FIG. 1, assume a data packet needs to be transferred between node 8 and node 12. This could take place via link 9 to node 16 to link 7 to node 12. This may be defined as an explicit route (8,9,16,17 and 12).

The assignment of telecommunication lines 20-25 to the communication software or network access methods (NAMs) independently running on processors 40, 42 and 44 (by control processor 46) (FIG. 4) is constrained in the SNA under discussion by the existence of multi-link Transmission Groups (TGs). A TG is essentially one logical telecommunication line consisting of multiple physical lines. Due to various performance considerations, it is not practical to distribute a single TG across multiple processors, although more than one TG may be assigned to one processor. Therefore, all lines which are part of a single TG are assigned to a single processor and, furthermore, the TGs become the quanta of network load that are distributed among the NAMs.

In the remainder of this disclosure, the term logical link or, simply link, refers to TGs (when TG protocols are used) as well as to individual telecommunication lines (when TG protocols are not used).

Session layer (layer 5) includes the transmission control (TC) and data flow control (DFC) sub layers. The session control layer activates, maintains and deactivates logical connections for transfers of data between end users.

Transmission Control manages pacing (flow control) and performs other functions (for example, cryptography) on behalf of end users. There is one Transmission Control Element (TCE), per session, per end user. Each TCE can be thought of as one end user session's "front office" to the communications network.

The data flow control (DFC) enforces dialog control between end users. For example, it accommodates the peculiarities of message direction and the intermittency demanded by the user. These peculiarities include, whether a user wants to communicate full duplex or half duplex, or whether the separate messages are parts of larger units of work as seen by the end user. There is one DFC per end user session.

The Presentation Services (PS) layer (layer 6) provides data formats and any needed data transformations. The pair of PS layers in the paired nodes have the job of accommodating different terminal interfaces seen by an end user and the application that is being accessed.

The final layer is the application layer (layer 7). The person or process that wants to use the network (the end user) provides this function. Strictly speaking, the end user is not part of the SNA network, but rather a user of the network.

Network traffic may be organized into two classes, from the point of view of the complex of coupled systems:

End point traffic, which either originates from the complex, or is destined for the complex.

Intermediate network node (INN) traffic, which has its origin and destination out in the network, and is "just passing through" the complex.

For example, in FIG. 1, traffic originating at 8 and destined for node 12 would be endpoint traffic at node 12, but would be INN traffic at node 16.

The capacity characteristics of the multi-processor network node are related to the mix between these two types of network traffic:

End point traffic experiences linear growth with the number of NAM processors while INN traffic tends to experience degradation as the number of processors is increased.

The present invention uses the realization that, for "end point" network traffic (that is, traffic originating at this node and destined for the network, and traffic originating in the network and destined for this node), there is a total affinity between a given TG and a collection of VRs and half-sessions. A given TG supports some number of ER End-Points. Any given ER End-Point is supported by only one TG. A given ER End-Point supports some number of VRs. Any given VR is supported by only one ER End-Point. A given VR supports some number of half-sessions. Any given half-session is supported by only one VR. Of course, each TG is bound at any time to a fixed number of DLCs but a single DLC is never concurrently shared by more than one TG.

Thus partitioning of the data transport functions according to TGs is possible. In the limiting case, there could be one partition for every single TG supported in the node; however, we also consider partitions that contain multiple TGs. These partitions of the data transport functions are the Network Access Method (NAM) instances.

Figure 5:
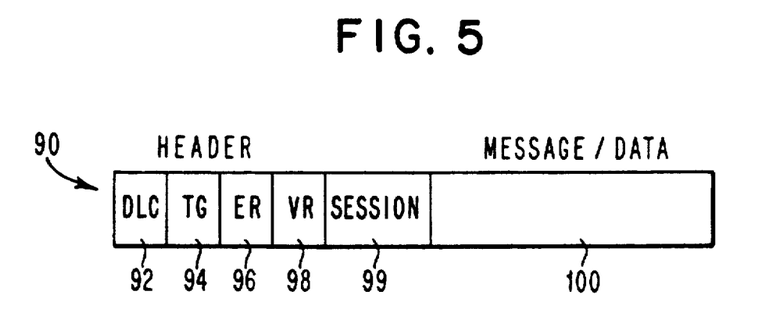
FIG. 5 shows schematically the structure of a header associated with a message.

A typical message will include a header area and a data area. The format is shown in FIG. 5. In the header area 90 various types of information are contained. As shown these may relate to the DLC at 92, the transmission group at 94, the explicit route at 96, the virtual route at 98 and session 99. Thereafter the data may be found at 100.

This format permits each of the particular layers of the node to strip off or prefix data relating to that layer. After all layers have processed the message packet what remains is the data necessary for processing or transmission.

Figure 3:
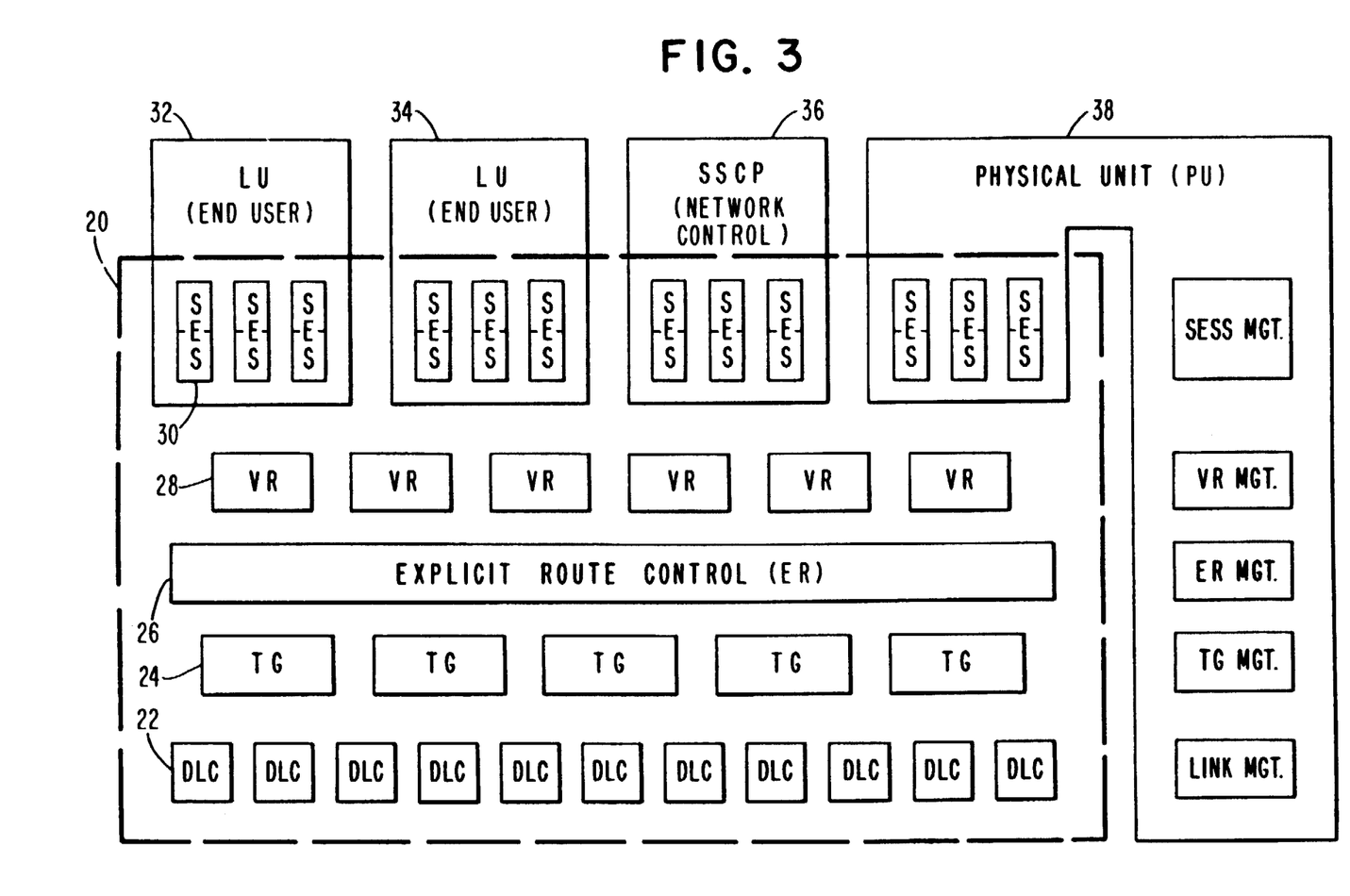
FIG. 3 shows the logical structure of a node.

Refer now to FIG. 3. The function of an SNA node can be subdivided into three broad, overlapping categories. These include the data transport functions, the control functions and network addressable units (NAUs).

The Data Transport Functions, (also known as "the send/receive path") are concerned with the movement of data between the network and the end-points (i.e., the NAU's described below). These are shown enclosed within the dotted line 20 in FIG. 3. These are the previously discussed "layers" of the SNA network: Data Link Control (DLC 22), Path Control (TGC 24, ERC 26, and VRC 28), and the Half Sessions (TC and DFC).

Technically, each Half Session is "in" one of the NAUs and the DLC and Path Control functions are shared equally by all of the NAUs. Note, though, that in a real implementation the data transport functions including the sessions, are all provided by a single body of code that is shared by all of the NAUs, so it is convenient to consider them as wholly separate from the NAUs.

The Control Functions are concerned with activating and deactivating the various data transport functions. These are actually management functions. While there are many instances of most data transport functions occurring within a node (e.g., more than 50,000 sessions in a large mainframe system), there is conceptually only one instance of the control/management functions occurring within any given node.

Figure 4:
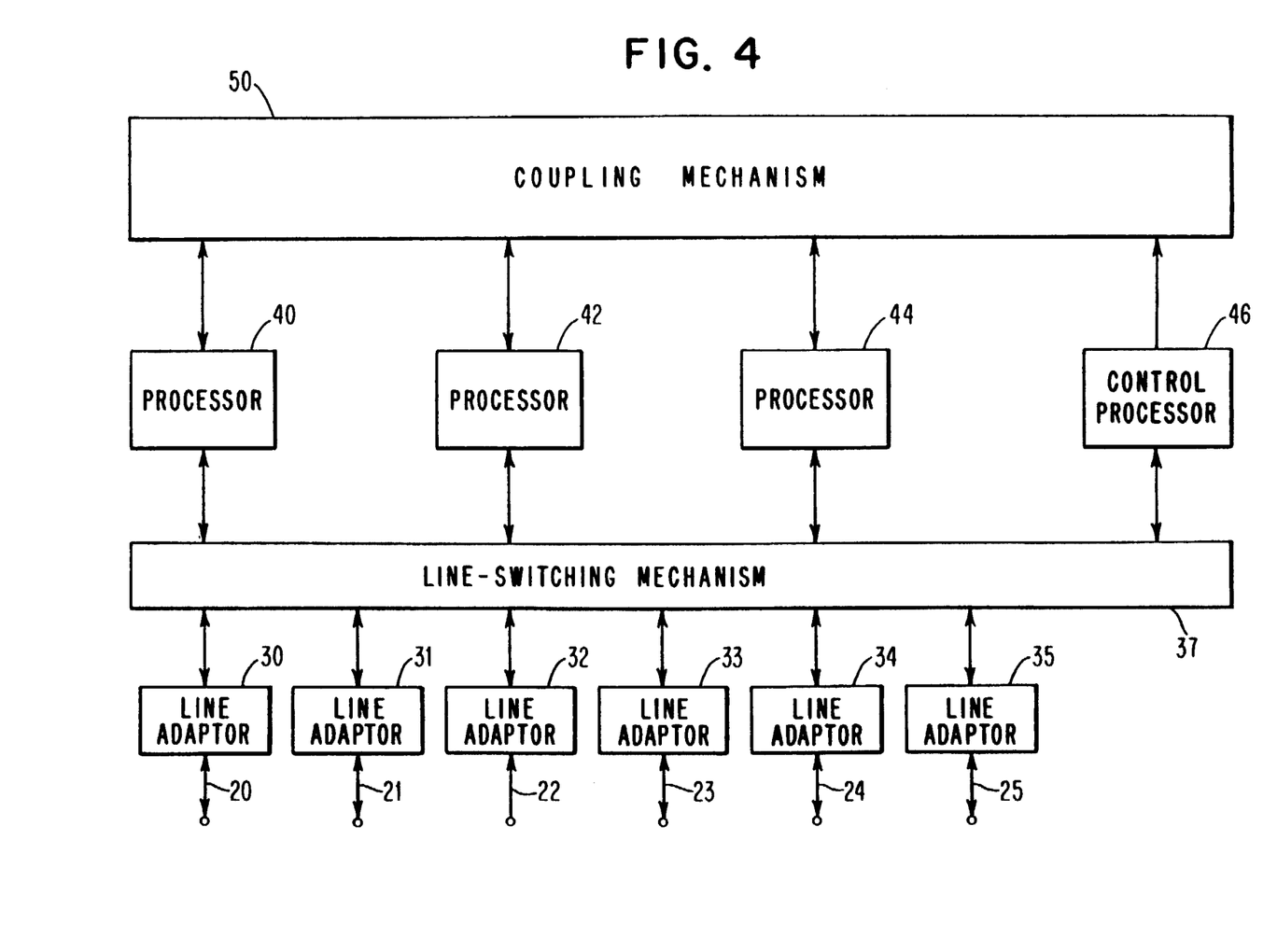
FIG. 4 is a block diagram of a coupled complex of computers.

Network Addressable Units (NAUs 32, 34, 36 and 38) are the representations of the end-points of a network node. There are three types of NAUs: Logical Units (LUs), which represent end-users; the System Services Control Point (SSCP), which is only present in some nodes and performs network control and management functions; and the Physical Unit (PU), which is present in every SNA node and serves as the architectural embodiment of the various control functions for that node. The control functions generally reside "in" the PU (the function in control processor 46).

It is important to note the distinction between the network control/management functions (the SSCP) and the node control/management functions (the PU), as both are loosely referred to in the art as "control functions" or "the control point."

The SSCP is an NAU that is only found in "Type-5" SNA nodes. The SSCP controls the operation of a subset of the entire network (the SSCP's domain), and interacts with other SSCPs in order to manage the entire network. An SSCP does not directly control any of the network nodes (not even its own), rather, it sends requests to the PUs that reside in the various nodes, and these PUs actually effect the node-specific control.

The PU is an NAU that is found in every node in the network. The PU controls the operation of the node, under direction of one or more SSCPs (which may be in remote nodes, if the PU is in a node that is not a "Type-5").

FIG. 4 is a schematic depiction of a data center having multiple processors and incorporating the present invention. Telecommunication lines 20–25 (physical layer) enter the data center through specialized line adaptors 30–35, respectively, which perform line control functions ("Data Link Control"- DLC) and interface to the various processors 40, 42, 44, and 46 through line switching mechanism 37.

Line adapters 30–35 perform the low level physical work necessary to either send a frame (of data) from storage over a telecommunications link, or to receive it over a telecommunications link into storage. In the receive case this involves scanning the line for bit transitions, detecting transmission errors, requesting retransmission if errors are detected, byte assembly, frame assembly, and finally signalling other software components that an entire frame has arrived. In the send case this involves serializing the data and presenting it to the telecommunications line a bit at a time, constructing error check codes such as a CRC or block check, and signalling of the software components when a link level acknowledgement has been received, indicating a completed transmission. For reasons of availability and configurability, line switching mechanism 37 permits switching of the path of a line adapter from one machine containing a NAM to another. This is particularly important in the event the first machine fails.

In order to meet capacity (load balancing) and availability requirements, telecommunication lines 20–25 are brought into the multi-system data center in such a way that each line can be switched among more than one of the individual systems. This is accomplished via line switching mechanism 37. There is no inherent requirement for total interconnectivity of all lines to all systems although, for purposes of explanation this is assumed to be the case. Normally, each line is "statically" assigned to one of the processors. These "static" assignments may be changed over time, however, to either re-balance the load of the systems, or to recover from the failure of one of the processors 40, 42 or 44.

The "coupling mechanism" 50 that is used for the intra-complex communications is high-speed and low latency as compared with typical network connections. Coupling mechanism 50 is part of the underlying hardware/software mechanism that makes this present invention attractive from a cost performance point of view.

All of the data transport functions which are "above" the DLC layer (see FIG. 2) are distributed among the various coupled processors 40, 42 and 44 of FIG. 4 and executed by a program known as a Network Access Method (NAM). In IBM's SNA, The NAM involves the Transmission Group (TG), Explicit Route (ER), Virtual Route (VR), and Session protocols. The NAM resides in each of processors 40, 42, 44 and 46 and implements each of these protocols. Each NAM runs independently of the other, although each can communicate with another NAM. It should be noted that the data transport (as opposed to the network control and management) functions account for the vast majority of processing requirements during steady state operation.

The Network Access Method (NAM) handles messages arriving over four separate software interfaces as follows:

1) NAM to NAM interface
2) Application (including the SSCP) to NAM interface
3) Data Link Control to NAM interface
4) NAM to Control Processor interface.

Each of these interfaces supports a fairly large number of different message types, formats, and functions and are described below.

On the input side, the NAM is responsible for receiving messages from the links once they have been checked for correctness by the DLC layer. Messages from any one DLC are received by an instance of the TG layer where they are combined into a single logical stream, and sent to the ER layer for routing. At that point the messages are either routed back out to the network in the case of INN traffic, or a determination is made that the messages have arrived at their destination. In the latter case the messages will make their way through the network layers, obeying the "architected" protocols, until they eventually reach the application.

On the output side, the NAM is responsible for allocating the individual packets for transmission on the DLCs. The NAM also handles cases where a DLC fails by reallocating pending transmissions on alternate DLCs, and the protocols necessary in general to provide the appearance of a single logical link that is in fact made up of a number of separate physical links.

The most complex of the interfaces is the NAM to Control Processor (PU) interface. This controls the setup and takedown necessary to support the steady state network protocols in the NAM. This interface handles Link activation, Network path control, Session services and Application services functions.

A number of interfaces are critical to the construction of this software: these include the NAM-application, NAM-NAM, NAM-SSCP, NAM-DCL, SSCP-DLC and SSCP-PU interfaces. These logical interfaces may, in general, cross machine boundaries and are implemented by a low level generic transport interface. The formats and protocols of these interfaces are either found within the published SNA architecture, or are implied by it, with the following exceptions. The NAM-NAM interface is new and is necessary because of the existence of more than one NAM and the NAM-application interface is subtly changed to support distributed applications. Both the NAM-NAM interface and changes to the NAM-application interface are explained later. Included in the invention, however, is a mechanism, implemented in each NAM and each DLC, whereby each message belonging to any one of these interfaces is recognized as such and is routed accordingly. Routing in the NAM and in the DLC is performed again through the use of a table mapping remote network resources (such as remote PUs and LUs) to outgoing TGs (NAMs) or communication lines (DLC) and local network resources to owning NAMs.

The NAM-PU and PU-DLC interfaces are extended by this invention to include the maintenance of the tables mapping local network resources to owning NAMs and DLCs. The PU is responsible for such maintenance. Note, however, that these interfaces are internal to a particular (logical) subarea node and do not affect its interaction with other network nodes.

The simplest of the interfaces is the NAM to NAM interface. It handles the arrival of messages not destined for this node. When such a message arrives, a determination is made by the ER layer as to which node the message will be sent to next. The path to that node will be via some TG, possibly owned by a different NAM from the one receiving the data. If this is the case, the message is simply sent via coupling mechanism 50 from the receiving NAM to the target NAM with no further work.

The application to NAM interface is complex in practice, though conceptually simple. The idea is that an end user in the network sitting at a terminal will "log on" to an application via this interface, and then proceed to interact with the application by sending and receiving individual messages that cross this interface. The contents of the messages are the responsibility of the application and end user; managing the flow of messages and guaranteeing order, delivery, and volume of the messages is the responsibility of the NAM.

The complexity of this interface in practice comes from the fact that the operating system must check the requests for validity, schedule the execution of either the application or of the NAM, and generally provide a certain level of integrity and protection across this interface. A number of options are available for scheduling, such as whether or not the application waits for a response from the user before proceeding, etc. that are not related directly to the network protocols or to the invention.

Control Processor 46 controls network operation by exchanging "network services Request Units (RUs)" with control points in other nodes using System Services Control Point (SSCP) based sessions, i.e., SSCP-SSCP, SSCP-PU, and SSCP-LU sessions where a PU is a physical unit in a node and LU is a logical unit or end user. Categories of network services RUs include:

(1) Configuration services which are supported on SSCP-PU sessions in order to activate and deactivate links, to load and dump nodes, to perform dynamic reconfiguration, such as assigning network addresses to local addresses and in general to control resources associated with the physical configuration.

(2) Session services which are supported on SSCP-SSCP and SSCP-LU sessions in order to assist LUs in activating LU-LU sessions. This includes activities such as resolution of network addresses by the SSCPs of network names presented by an LU in its session initiation request, checking of end-user password and access authority, and selection and matching of session parameters.

(3) Maintenance and management services which are supported on SSCP-PU and SSCP-LU sessions in order to perform testing and tracing, and to record statistics on network resources.

(4) Measurement services, which are a category of network services set aside for future definition. Currently, all collection of measurement data is implementation defined, using LU-LU sessions.

More information about the various categories of network services, specific for SNA, can be found in chapters 7, 8 and 9 of *SNA Format and Protocol Reference Manual: Architectural Logic*, SC30-3112. Since messages that are network Services Request Units (RUs) can be recognized as such by the receiving NAMs, incoming Network Services RUs can be correctly routed to the Control Processor by the receiving NAM. On the other hand, the PU (running on the Control Processor) will be equipped (as part of this invention) with a table mapping SSCP-SSCP, SSCP-PU and SSCP-LU sessions to outgoing TGs belonging to individual NAMs for remote SSCPs, PUs and LUs. For local PUs and LUs the aforementioned table will map SSCP-PU and SSCP-LU sessions to the individual NAM owning the PU or LU.

A processor to processor SEND/RECEIVE mechanism that permits a NAM or Control Point to communicate with (another) NAM or control point is needed. This must be reasonably fast relative to the network lines, and must deliver messages correctly in the order in which they were sent.

A system wide directory service for locating other software components within the system, and a mechanism for establishing logical paths between them to be used by the SEND/RECEIVE mechanism is also needed. This is generally implemented as follows: a low level datagram service in coupling mechanism 50 provides for the delivery of packets of information from one machine to another. A higher level protocol, either in hardware or software checks the transmission for errors, retransmits if necessary, and reorders out of sequence packets. This layer may also be responsible for breaking up long messages into smaller packets if required by the underlying hardware. The global directory services is built on a centralized database that contains the names, with either a distributed or centralized software component that updates the database and searches for them. This component is then able to map software component names to low level hardware addresses used to set up logical paths.

The various network control and management functions (SSCP) remain monolithic as well as the subarea node control and management functions (PU), and reside on processor 46 (also referred to as the control point). Control Processor 46 communicates with and directs the operation of the various NAMs through the complex's coupling mechanism 50. Note that Control Processor 46 is not involved in the normal data transport functions. It is involved with "bring up" and "take down" activities. For example, when a telecommunication line becomes active, the PU residing in Control Processor 46 decides which NAM will handle this line and then directs that NAM to "capture" the line via the line switching mechanism.

The present invention distributes the function of a host subarea node to multiple communication function processors (CFP) of data processing complexes.

As shown in FIG. 3 there are network resources (e.g., sessions, VRs, TGs, and DLCs) and managers in every network node. The managers are responsible for the activation and deactivation of the resources in their node and are collectively called the PU. In the present invention all of the managers are put into the control point processor 46 and all the remaining network resources are spread among the NAMs defined in the complex.

In the present invention resource agents are used. Resource agents are programs contained within one NAM that represent a resource in another NAM. The sole purpose of a resource agent is to receive messages for the resource that they represent and to forward them to the NAM containing the resource. The resource to NAM mapping is dynamic and is performed at resource initialization time by its respective manager (in the Control Processor).

Resources are entities that reside in the NAM and in the PU. There can be both manager and non-manager resources. Non-manager resources have network addresses by which they can be identified by any other resource in the network. Non-manager resources include both physical resources (such as links, line adapters, and nodes) and logical resources (such as sessions, transmission groups, virtual routes, explicit routes and data link controls). Resources in the PU are managers. Manager resources control the non-manager resources under the auspices of a particular PU.

Managers are initialized at IPL and are informed every time a new NAM is added to the complex. Agents are created in that NAM for representing all the resource managers. Agents for network resources that are not managers are created when a need arises for them in a specific NAM. There is no need for link agents although there are link manager agents in each NAM.

If for example an ER is activated that does not originate or is not destined for the complex, but that enters the complex from a first transmission group (TG1) and exits from another transmission group (TG5), and if the first transmission (TG1) group is currently owned by, for example, NAM 3 and the second transmission group (TG5) is currently owned by NAM 7, then an agent will be created with an identification (id) equal to TG5 on NAM 3 to receive all transit messages traveling on this ER and entering the complex through the first transmission group (TG1). These messages are then forwarded by this agent TG5 to NAM 7 where they exit the complex. By giving the agent the same id as the resource that it represents, it is now possible to make existing single physical subarea node communication software fully reusable in a new environment, since the agent acts as if it were the resource. The use of the agent hides the fact that the resource itself is not in the NAM, and makes the location of the resource transparent to the communication software.

Programs that accomplish the above are described and shown in flowcharts and in pseudo-code described below. Pseudo-code is a generalized language having similarities to numerous other computer languages and is generally used for purposes of explanation.

Figure 6:
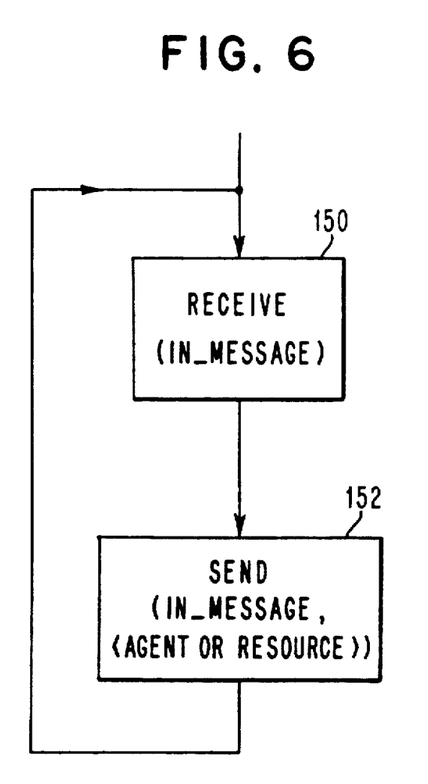
FIG. 6 is a flowchart for a manager or resource agent.

FIG. 6 shows a flowchart for a network access method having the name <NAM_id>. At 150 a message is received called in_message. At step 152 the message in_message is sent to the appropriate agent or resource which then handles the message. This operation loops continuously via path 153.

Figure 7:
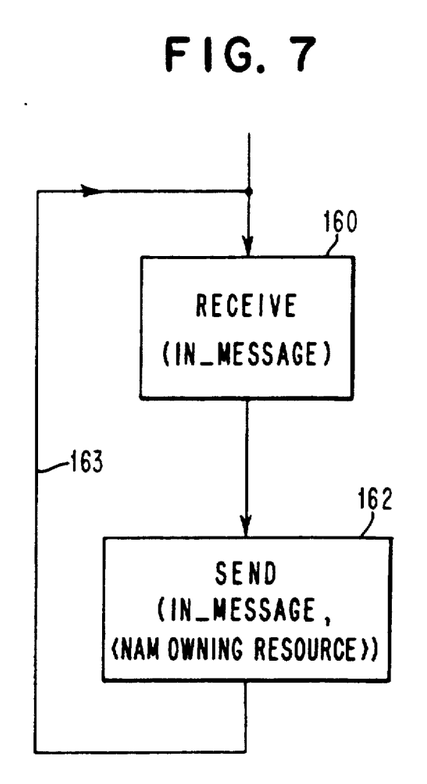
FIG. 7 is a flowchart for a manager resource.

In FIG. 7 an abbreviated flowchart for a non-manager resource which for example may receive the in_message from the flowchart of FIG. 6 is described.

At step 160 the message is received and at 162 the message is sent to the NAM owning the resource. This operation also loops on path 163 in a continuous manner. Pseudo-code describing this function is as follows:

```
<resource-id>: procedure (in_message) do forever
receive(in_message);
/*owner returns the NAM-id currently owning*/
/*the resource <resource-id>*/
send in_message, to owner (<resource_id>);
end;
```

This pseudo-code assumes that each message, as described previously, contains in its header a sequence of resource id's that will be called upon to process the message upon its arrival. For example, the link-id, TG-id, ER-id, VR-id, and the session-id. A layered network architecture is also assumed in which parts of the header are peeled-off as the message progresses from lower to higher layers and parts of the header are added if the message travels from higher to lower layers until it is physically transmitted.

It is further assumed that the extract resource id extracts the resource from the header.

Figure 8:
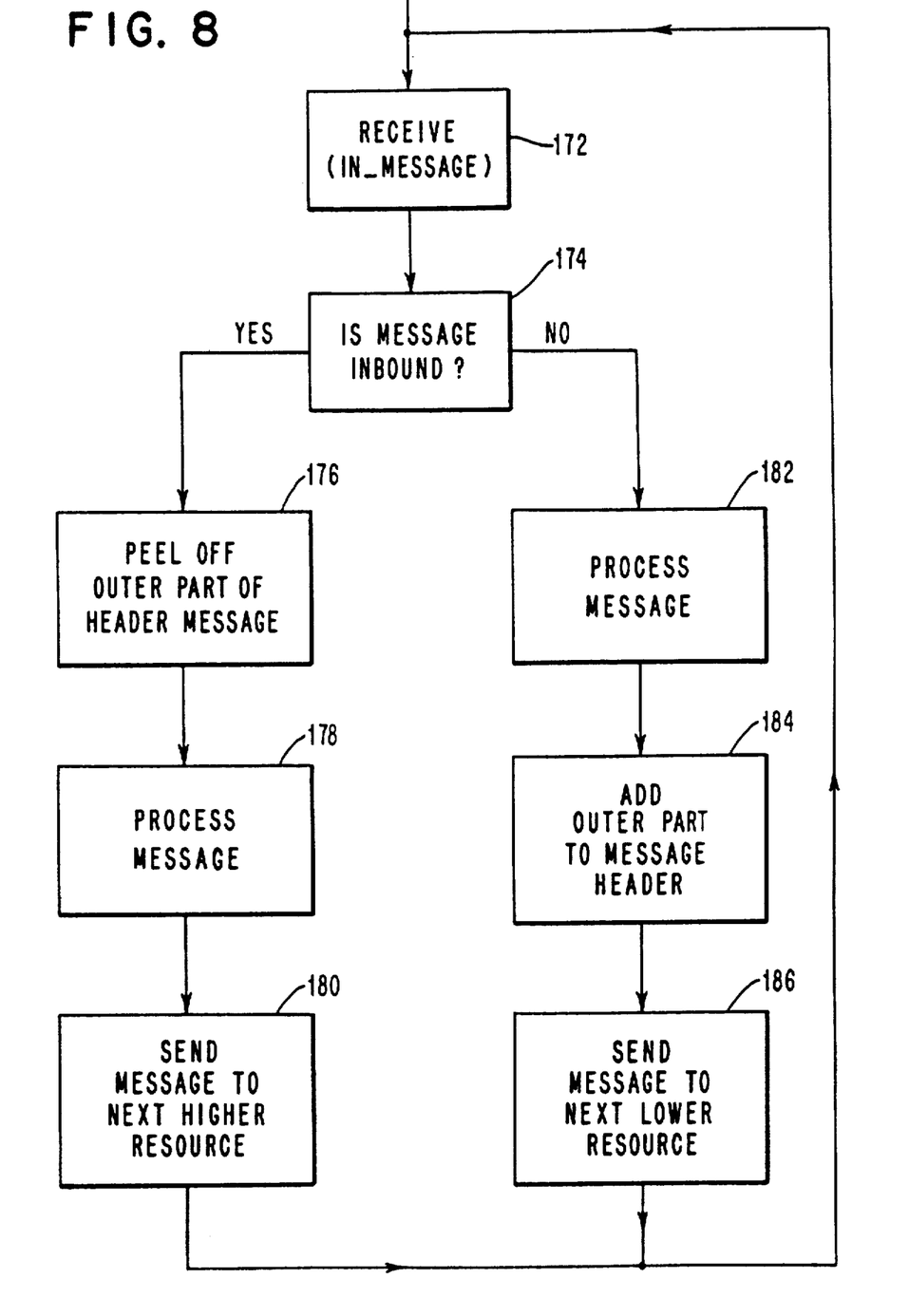
FIG. 8 is a flowchart for a non-manager resource.

FIG. 8 shows a flowchart for a non-manager resource. At step 172 a message is received (in_message) and at 174 a decision is made whether the message is inbound or not. If it is inbound, processing branches off to step 176 in which the outer part of the header message is peeled off and at 178 the message itself is processed. Thereafter the message is sent immediately to a higher resource at 180. Processing then continues again at step 172 to receive another message.

If on the other hand the message is not inbound, then it must be outbound and processing continues at step 182 where the message is processed. At 184 additions are made to the outer part of the header of the message and at 186 the message is sent to the immediately next lower resource. Thereafter processing loops again to step 172.

Pseudo-code representative of this process is described as follows:

```
<resource-id>: procedure(in_message) do forever
receive(in_message);
case
when in_message is inbound
begin
peel_off_outer_part_of_header(in_message);
/*processing of the in_message follows depending*/
/*on the particular*/
process(in_message);
send in_message to extract_resource_id(in_message);
end;
when in_message is outbound
begin
process(in_message);
add_an_outerpart_to_header(in_message, <resource_id>);
/*the message is sent to the immediately lower*/
/*layer resource that serves the request of*/
/* <resource-id>. For example, if <resource-id>*/
/*is a session, then my_server_resource_id is */
/*the VR on which this session is mapped*/ send
in-message to my_server_resource_id;
end;
endcase;
end;
```

Figure 9:
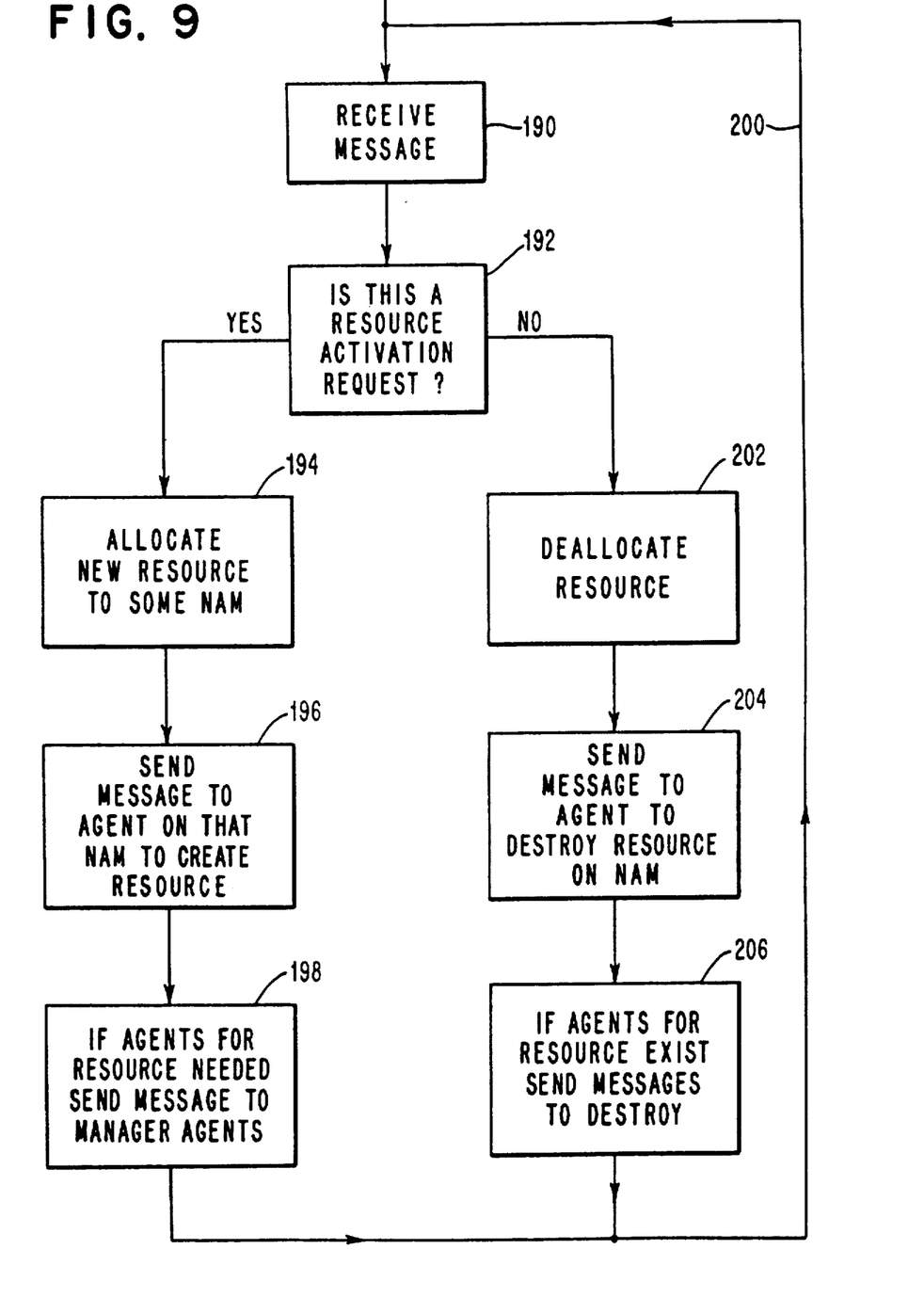
FIG. 9 is a flowchart for a network access method (NAM)

FIG. 9 shows a manager residing on the control point processor as part of the PU and is the flowchart of a manager resource. At step 190 the message is received. At 192 a decision is made as to whether this is a resource activation request. If it is, processing continues to step 194 where a new resource is allocated to some NAM. Thereafter at step 196, a message is sent to this manager's agent on that NAM to create the resource. At step 198 if the agents for the resource are needed in other NAMs (for example in the case of a TG receiving INN messages from other than the owning NAM) a message is sent to the manager agents. Thereafter, via loop 200, processing continues continuously beginning again at step 190.

If this is not a resource activation request, then it must be an inactivation request and therefor at step 202 the resource is deallocated from the NAM. Thereafter, at step 204 a message is sent to the agent to destroy the resource on the NAM and at step 206, if the agent for the resource existed on other NAMs, messages are sent to destroy them as well. Thereafter, processing loops in a continuous fashion by path 200.

```
Pseudo-code representative of the above is described
as follows:
<manager-resource-id>: procedure(in_message)
do forever
receive(in_message);
    case
        when in_message is resource_activation_request
            begin
                allocate_new_resource_to_some_NAM(in_message,
                                                    NAM_ID);
/*the manager sends a message to its agent in*/
/*the NAM where the new resource was created.*/
/*informing it of the fact. Note that the */
/*header of the message has the manager's id*/
/*  which is also the id of its agent*/
            send '<manager-resource-id>, create new
            resource. <resource_id>' to NAM_ID;
/*In the case of resources with agents the*/
/*manager has to notify its agent on the NAM*/
/*where the resource agent is to be created.*/
            end;
        when in_message is resource_inactivation_request
            begin
                deallocate_resource from NAM(in_message,
                                                NAM_ID);
                send'<manager-resource-id>, destroy
                    resource. <resource_id>'
                    to NAM_ID);
            end;
    endcase;
end;
```

Upon receipt of a message from its manager, the manager's agent creates or destroys a resource in a local NAM (and its associated program) or an agent of that resource in the case when the resource is not owned by a local NAM. Any other message is simply forwarded to the manager.

Figure 10:
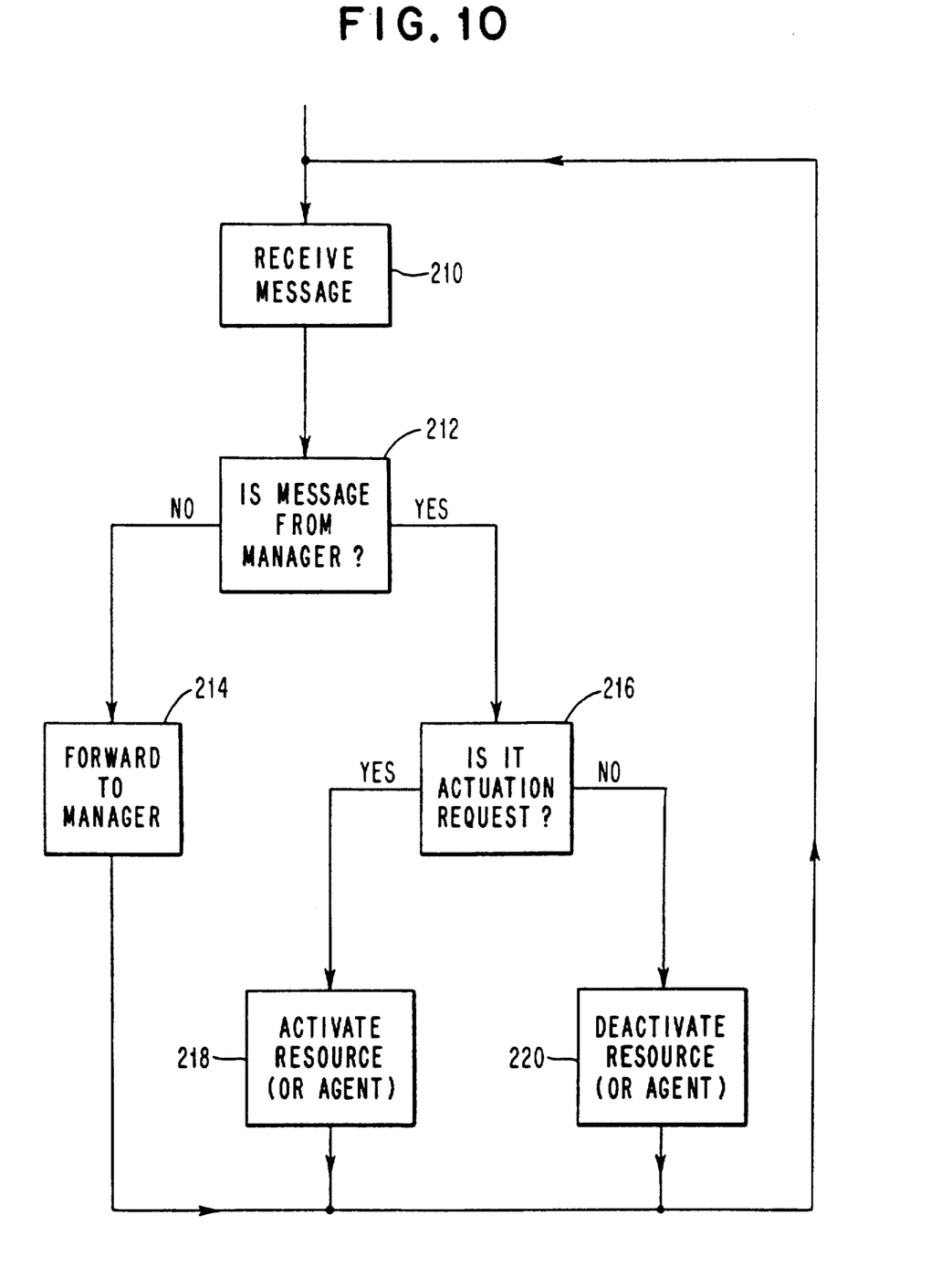
FIG. 10 is a flowchart of a non-manager resource.

In FIG. 10 a flowchart describing this operation is shown. At step 210 the message is received. It is then determined at step 212 whether it is a message from a manager or a message from some resource in this NAM. If it is from a resource in this NAM, the message is forwarded to the manager in step 214 and thereafter operation returns to step 210. If however, the message is from a manager, it is determined at step 216 if it is an activation request. If it is an activation request, at step 218 the resource (or its agent) is activated. If it is not an activation request, at step 220 the resource or its agent is deactivated. Thereafter, processing continues at 210.

Finally the following pseudo-code is presented for the NAM message processing.

```
_NAM-id_(in_message)
do forever
receive(in_message);
send in_message to
    extract_resource_id(in_message);
end;
```

In this procedure a message is received on a continuous basis such that first the message is received and then the message is sent on to the appropriate resource or resource agent.

The following provides an example of the typical operation of the present invention from time of initialization. At the "beginning", nothing in the Single Node Image according to the present invention, is active. First, the control/management functions (the PU) in the Control Processor 46, are activated. For this discussion, these functions will be referred to as "Control Processor" rather than "the control/management functions in the control processor".

There need be absolutely nothing special about control processor 46 versus the other processors 40-44. The first one to come up "wins" and elects itself to be the control processor. Other means could be used to designate the control processor; such means however are not within the scope of the invention and will be apparent to those of skill in the art.

Control processor 46 makes itself known to the other processors in the data center via means that are also outside the scope of the invention. Such means could involve some sort of "broadcast" of its existence to the other processors via coupling mechanism 50; another possibility is "registration" of its existence in some directory, either centrally-maintained or distributed.

As the other communication processors 40-44 are activated, they identify themselves to the control processor 46 via coupling mechanism 50. The control processor maintains a list of all of the active communication processors, along with other pertinent information (e.g., how much "load" has been assigned to each of them). At the time that a processor first identifies itself to the control processor, the control processor sends relevant initialization information to the other communication processors; as changes are made to the state of the node (e.g., routes being activated or deactivated), the control processor will send additional relevant information to the communication processors as necessary.

At initialization time, the control processor 46 directs line switching mechanism 37 to connect all of the line adaptors 30-35 to itself. Note that at this point the line adaptors are not yet operational.

In an SNA network, the line adaptors are activated under the direction of the control processor. It is easy, however, to imagine situations where the line adaptors are activated through other means, in which case, they would immediately identify themselves to the control processor (via the line switching mechanism, which has been set-up to connect the line adaptors to the control processor). In either case, as a line adaptor is first becoming active, it is in direct communication with the control processor.

As each line adaptor becomes active, the Link Management function in the control processor (part of the PU: see FIG. 3) communicates with the newly-activated line adapter and proceeds to aid the line adapter in initializing its DLC function. For an SNA link, this involves the exchange of identity information between the DLC and the control processor, and the further exchange of identity information (via messages called "XID"s—"eXchange IDentity") with the peer DLC function at the other end of the link. As part of this initialization process, the control processor determines the Transmission Group to which this link is to be joined: this may be pre-determined (e.g., by statically "genned" tables), or may be determined dynamically via the XID process. If TG protocols are not being used for this link, it is the same as if TG protocols are being used except that this link will be the the only link in the "TG" (i.e., a "degenerate TG").

There are two possibilities: either the TG is already active (with one or more links already "joined"), or it is not currently active. If the TG is active, then it will have already been assigned to one of the instances of the NAM process, and that NAM process will have been assigned to one of the processors 40–44. In this case, the control processor 46 will communicate (via coupling mechanism 50) with the NAM process in its processor to inform it of the activation of the DLC function in the line adaptor. The control processor 46 will then direct the line switching mechanism 37 to connect the newly-activated line adaptor to the processor that contains the NAM process. At this point, the TG instance in the NAM process assumes control of the line adapter, and the DLC is now "up" and will join the other links in this TG in passing network traffic to the adjoining network node.

If the TG is not active (or, if this link does not use TG protocols), then the remaining activation process is a bit more involved, since the TG instance first needs to be activated. Using methods that are outside the scope of this invention (e.g., load balancing algorithms), the control processor will either decide to assign the new TG to an existing instance of the NAM process, or to create a new NAM for the TG. In this latter case, the control processor will select a processor for the NAM, and cause the NAM process to be initiated on that processor (e.g., by communicating with the processor's operating system). Once a NAM process has been selected, the control processor communicates with the NAM and directs it to create a TG instance, passing along relevant information (e.g., the identity of the TG, its characteristics, the identity of the network node to which the TG will be connected). Then, control of the link is transferred to the Processor containing this NAM process, as previously described. In addition, all other NAMs will be made aware of this newly-activated TG, so that they will "know" on which Processor it is located in order to be able to route INN traffic to this link, as necessary.

At this point, we have described how to activate the single node image. Note that activation procedures and protocols that are dictated by SNA have been omitted, as there is no substantive change between a traditional, single-computer SNA node and this multiple-computer SNA node, with respect to the SNA protocols.

The various SNA resource instances (e.g., TGs, ER endpoints, VRs, sessions) communicate, as necessary, with their corresponding resource managers in the control processor (e.g., the TG manager, the ER manager, the VR manager, the session manager). This communication is done via coupling mechanism 50, in combination with appropriate low-level software mechanisms which are not of particular interest to this invention. It is assumed that each NAM process contains an "agent" of each of the resource managers (e.g., a TG manager agent, etc.) through which this communication flows; when the control processor needs to create a new resource (e.g., a new TG instance) on a NAM, it will send a message to the appropriate agent in the NAM (e.g., the TG manager agent) and the agent will mediate the actual creation and initialization.

Also, in the normal course of operation, when certain "supervisory" messages are received from the network by one of these resource instances (e.g., the arrival of a routing update message by the ER layer), the message will be forwarded, via the agent, to the appropriate manager in the control processor (e.g., the routing update message will be handed-off to the ER manager agent, which will send it through the Coupling Mechanism to the ER manager in the control processor). Likewise, "supervisory" messages generated by the managers in the control processors are sent to the appropriate resource instances (for delivery to the network) via the reverse path: the manager sends the message through the coupling mechanism 50 to the manager's agent in the appropriate NAM, which then forwards the message to the appropriate instance of the resource. (e.g., The ER manager generates a routing update, which it sends to the appropriate ER manager agent for delivery to the ER layer and eventual transmission to the network.)

The activation of sessions, pose somewhat unique problems since they are the network node's connection to the end-users. These end-users are beyond the control of the node (and, beyond the scope of this invention). First, these end-users (known as Network Addressable Units in SNA networks) are described.

Conceptually, an end-user is another program which communicates with the network node via some more-or-less well-defined set of interfaces. These interfaces are commonly called an "Application Program Interface" (API), and the program representing the end-user is called "the Application" (this is Layer 7: the Application Layer). The network node's API is, effectively, the "boundary" of the network; in the context of this invention, it is the "boundary" of the scope of the invention.

In the same manner that this invention demonstrates a means of distributing a single network node across a multiplicity of processors, it is assumed that other work will demonstrate similar means for distributing single applications across a multiplicity of processors. In order for horizontal growth to be achieved, this invention assumes that most of the end-user applications are so distributed, such that there is a piece of each distributed application in each of processors 40–46. Such applications are herein referred to as "fully distributed applications."

There will always be, however, applications which are not Fully Distributed. Some applications may be only "partially distributed", and others may not be distributed at all. As will become evident, these are merely different degrees of the same problem. For the present discussion only non-distributed, "monolithic" applications will be considered. In the present invention, the physical unit (which is an end-user, albeit a very special one) is one such monolithic application. It is assumed that each monolithic application exists on (only) one of the processors, and that all of its communication with the network node (and, thereby, the network) is via the API provided by one of the NAM processes running on that processor (note that each processor may have more than one NAM).

It is further assumed each fully distributed application has at least one instance of itself in each processor such that there is an application instance communicating with the API of every NAM process in every processor.

Now consider two cases of session initialization: some "other" end-user attempts to bind a session to one of the applications of the Single Node Image (the "inbound" case); and one of the applications of the Single Node Image attempts to bind a session to some "other" end-user (the "outbound" case). Note that it is possible for one application of the node to bind a session to another application of the node—this is simply a combination of both cases.

First, the "inbound" case. The attempted creation of a new session is heralded by the arrival of one or more "session creation" messages. In an SNA network, this is the "Bind Session" message, which arrives at the node via normal network transport mechanisms. Specifically, the session initiation message(s) arrives over some link or transmission group of links, and is forwarded by line adaptor(s) (30-35) to the particular Processor to which the line adaptor(s) has been previously connected. Normal node processing functions will cause this message to be passed "up" through the network layers until it reaches the session layer, where it is recognized as a "supervisory" message and is forwarded to the session manager in the control processor 46 (by way of the session manager agent).

The session manager may reject the session creation request outright (e.g., for access control or security reasons), or it may provisionally accept the session. If the session is accepted, the control processor determines which end-user application this session is for (e.g., by extracting the application's name from the session creation message). If the application is fully distributed, the session manager will direct the NAM at which the session creation message arrived to go ahead and create the session. The NAM will create a session instance and signal the end-user application, via the API, that the new session is there. The application may choose to reject the session; if not, then the session is put into service, and may be used to send and receive information through the network. From this point forward, information will flow on the session without any involvement from the control point or any other NAMs.

If the application is monolithic, the control processor may discover that the one instance of the application just happens to be associated with the NAM at which the session creation message arrived. This case is treated just like the fully-distributed case. In all likelihood, however, the application is on some "other" NAM, and the control processor has to mediate the construction of a "cross-NAM session"—that is, a session which arrives from the network on one NAM, yet is connected to its application on some other NAM.

Cross-NAM sessions are realized by mechanisms which are very much like the "agents" of the managers in the control processor. The control processor directs the NAM at which the session creation message arrived to create a "session agent". At the same time, the control processor directs the NAM to which the monolithic application is bound to create a cross-NAM session. The session agent and the cross-NAM session are told (by the control processor) of each other's existence, and proceed to establish a communication path between themselves (via coupling mechanism 50). Henceforth, information arriving from the network for this session will be delivered to the session agent, which will forward it to the "real" cross-NAM session in the "other" NAM process. Likewise, information generated by the (monolithic) application will be forwarded by the "real" cross-NAM session to the session agent, which delivers the information to the network.

Now, the "outbound" case of session initiation, where an application (fully distributed or monolithic) of the node attempts to bind a session to some "other" end-user, is discussed. The application uses the API to request that the node create the new session. For a fully distributed application, which may issue the request to any of the various NAM processes, we assume that there are two such requests: a "non-movable" request, which requires that the session be created on the same NAM where the request was made, and a "moveable" request, which permits the session to be created on any of the NAMs (since, by definition, the application has interfaces to all NAMs). (Note that in IBM's "ACF/VTAM" implementation of an SNA node, the "non-moveable" request is represented by the "Open Destination/Acquire" request, and the "moveable" request would be represented by the "Simulate Logon" request.)

For a monolithic application, the "moveable" request degenerates to the "non-movable" request, since there are no other NAMs to which the session could be "moved".

Both types of session initiation requests are forwarded to the control processor for processing. The control processor uses methods that are architected by the network to determine the optimal route for the session, independent of the NAM where the session-initiation request was issued. The route which is chosen will exit the Single Node Image on some specific link or transmission group of links, which will be connected to some NAM (not necessarily the NAM where the session-initiation request was issued). At this point, either a "normal" session or a "cross-NAM" session is constructed as appropriate, under the direction of the control processor. A "normal" session can always be constructed for a "moveable" request from a fully distributed application; a "cross-NAM" session must be created for a "non-moveable" request issued on some NAM other than the NAM that controls the Transmission Group (link(s)) over which the session will be routed.

The capacity of multi-processor systems is related to the quantity and type of inter-processor communication. If the processors are totally independent of each other (i.e., there is no inter-processor communication), then the capacity of the system grows approximately linearly with the number of processors: doubling the number of processors doubles capacity. If there is a large amount of inter-processor communication, either explicit or incidental, then the capacity of the system will not grow linearly with the number of processors. In fact, capacity may increase very little (or actually decrease) as processors are added.

Capacity for end point traffic grows linearly in the present invention because there is no inter-processor communication. This is based on the strictly hierarchical organization of the protocol layers of virtual circuit oriented networks (such as SNA). Each logical link contains some number of network routes which have end points in the multi-processor complex. Each network route contains some number of virtual circuits and each virtual circuit contains some number of sessions.

Therefore, all of the end point traffic (session, virtual circuit, and route end point traffic) can be partitioned according to the logical link on which it enters or leaves the complex. If a session needs to be initiated with a terminal which is accessible via link 20, then that session will be handled by the VR to which Link 20 is assigned. If there is a choice of possible links (e.g., the terminal is accessible via both Link 20 and Link 21), then other factors, such as load balancing, can be considered when choosing the link (and, thereby, the VR) which will carry this session.

Note that this linear growth in capacity for end point traffic is only for "steady state" traffic. Initiation and termination of connections (sessions, virtual circuits, routes) is handled by control processor 46, which has the potential to become a bottleneck when there is an excessive amount of connection initiations and terminations (e.g., at network startup or shutdown).

Capacity for INN traffic degrades as the number of processors increases due to the quantity of cross processor communication. Note that, by definition, INN traffic enters the multi-processor complex via one logical link and exits the complex via another link. If there are N NAM processors then, to first order, an INN message entering on a link assigned to NAM n only has a 1/N probability of leaving the complex on a link which is also assigned to NAM n (and, thereby, avoiding inter-processor communication). There is a N-1/N probability that the outbound link is assigned to some other NAM, n', necessitating communication between NAM n and NAM n'. The likelihood of inter-processor communication (interference) on a per INN message basis increases with the number of processors.

Line adaptors 30-35 are single points of failure. While it is possible to duplex the line adaptors and attach the telecommunication lines via another interconnect switch, the telecommunication lines themselves (as well as the interconnect switch) would continue to be single points of failure. Line failures must be addressed by higher level communication protocols (such as the multi-link Transmission Groups mentioned above).

In the prior art SNA architecture, recovery of a failed NAM is "all or nothing": either the exact state (as seen by neighboring nodes in the network) is reconstructed totally, or the NAM will have to show a failure (to the network) by tearing down those sessions, virtual circuits, and routes which it was responsible for and reinitializing them one by one. This situation is not, however, as bad as it appears. Through the judicious use of known fault detection, isolation, and recovery facilities, most faults can be limited to a single session or a small group of sessions. Even the catastrophic failure of a NAM (e.g., total corruption of its state) will only affect that portion of the total network load which was being handled by that NAM. If the multi-processor complex is utilizing N NAM processors, then approximately 1/N of the network would be affected by a catastrophic failure of a single NAM.

Depending on the coupling facilities available in the complex, it may be possible for one processor to take over for a failed NAM, and continue processing with minimal impact on the network load. This may involve recovery techniques contained within the coupled complex (e.g., using variations of checkpointing and journaling techniques), or may involve so-called "end-to-end" recovery techniques in which the takeover NAM sends special resynchronization messages into the network. The details of such recovery schemes are beyond the scope of this invention. It should, however, be noted that the structure proposed by this invention provides a sound base on which such recovery techniques can be implemented.

We claim:

1. Apparatus for interfacing a processor system to a communication network having a multiplicity of nodes and a multiplicity of communication lines connecting said nodes to each other, said processor system having a single node address in said network and acting as one of said multiplicity of nodes in said network, said one node serving a multiplicity of local communication end points and said nodes in said network other than said one node serving a multiplicity of non-local communication end points, said nodes in said network each performing network management and communication session management functions and exchanging network management messages and session requests for establishing communication sessions between individual pairs of said local and non-local communication end points in response to said session requests, said apparatus for interfacing comprising:

a control processor for providing said network management and communication session management functions for said one node;

a plurality of non-control processors interfacing said communication lines that connect said one node to said other nodes of said network with said local communication end points; and a local communication system interconnecting said non-control and control processors, said non-control processors transporting data between said communication lines and said local end points via said non-control processors without routing said data through said control processor, said non-control processors forwarding said session requests and network management messages received from said network to said control processor via said local communication system and forwarding said session requests and network management messages received via said local communication system from said control processor to said network, said control processor determining data transport paths to be created within said processor system to enable said communication sessions to be established in response to said session requests, said data transport paths not extending through said control processor, said control processor directing said non-control processors to create said determined data transport paths, said non-control processors creating said determined data transport paths in response to said directing from said control processor.

2. Apparatus as defined in claim 1 wherein said control processor allocates said communication lines that connect said one node to said other nodes among said non-control processors, and further comprising:

line switching apparatus responsive to said control processor for connecting said communication lines to said non-control processors in accordance with an allocation of said communication lines determined by said control processor.

3. Apparatus as defined in claim 2 wherein said control processor monitors a data transport load being carried by each of said non-control processors and varies said allocation of said communication lines in response thereto.

4. Apparatus as defined in claim 2 wherein said control processor monitors an operation status of said communication lines and said non-control processors and varies said allocation of said communication lines as needed in response thereto.

5. Apparatus as defined in claim 2 wherein said control processor allocates said communication lines only among said non-control processors.

6. A computer implemented method for making a system of interconnected processors connecting a multiplicity of local communication end points to a multinode communication network act like a single node, comprising, when implemented by said system of interconnected processors, the steps of:

identifying said system of interconnected processors with a single node address;

designating one of said interconnected processors as a control processor and designating other ones of said processors as non-control processors;

connecting communication lines from said multinode communication network to said non-control processors;

forwarding network management messages and session requests received by said non-control processors and addressed to said single node address to said control processor;

implementing network management and session management functions of said single node with said control processor; and implementing data transport functions of said single node with said non-control processors, said non-control processors transporting data between said network and said local communication end points without routing said transported data through said control processor.

7. A method as defined in claim 6 wherein said control processor controls connections of communication lines to said non-control processors in accordance with an allocation determined by said control processor.

8. A method as defined in claim 7 wherein said control processor monitors a data transport load carried by each said non-control processor and varies said communication line allocation to each said non-control processor in response thereto.

9. A method as defined in claim 8 wherein said control processor monitors an operational status of said communication lines and said non-control processors and varies said communication line allocation as needed in response thereto.

* * * * *